May 12, 1942.  B. C. PHILLIPS  2,282,376
CARBURETOR CHOKE CONTROL
Filed Oct. 10, 1941    2 Sheets—Sheet 1
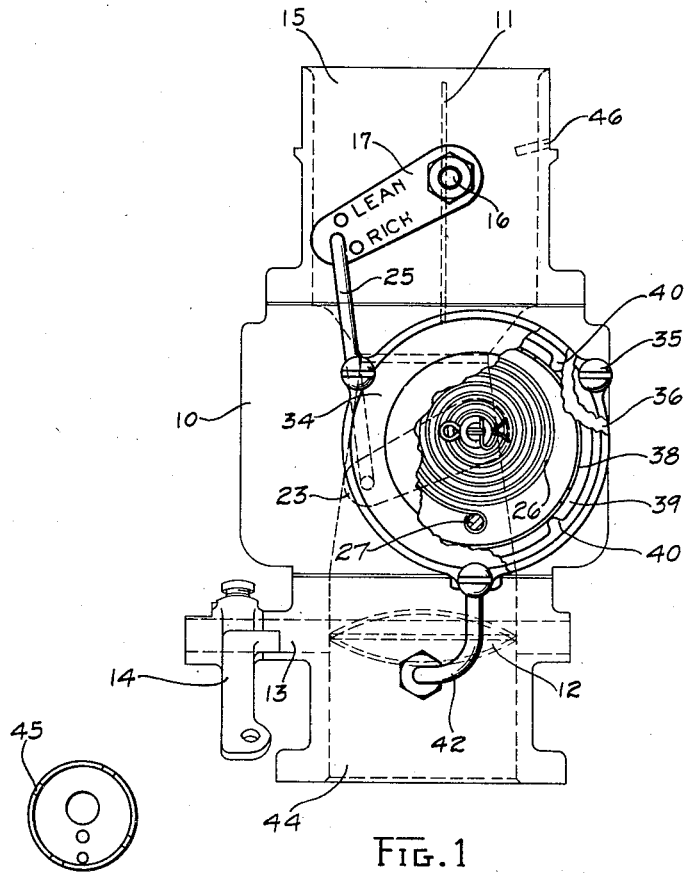
FIG. 1
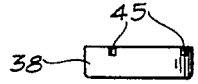
FIG. 5
FIG. 4
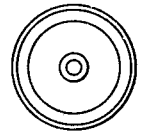
FIG. 7
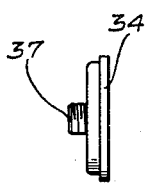
FIG. 6
FIG. 8
FIG. 9
FIG. 11
FIG. 10
INVENTOR
Bernard C. Phillips May 12, 1942.　　B. C. PHILLIPS　　2,282,376
CARBURETOR CHOKE CONTROL
Filed Oct. 10, 1941　　2 Sheets-Sheet 2

INVENTOR
Bernard C. Phillips

Patented May 12, 1942

2,282,376

UNITED STATES PATENT OFFICE 2,282,376

CARBURETOR CHOKE CONTROL

Bernard C. Phillips, Toledo, Ohio, assignor to The Tillotson Manufacturing Company, Toledo, Ohio, a corporation of Ohio Application October 10, 1941, Serial No. 414,393

10 Claims. (Cl. 123—119)

This invention relates to carburetors and more particularly to carburetor choke valve controls adapted for use in connection with internal combustion engines.

Internal combustion engines ordinarily require an abnormally rich mixture for starting purposes. This is particularly true when the temperature is low. As the engine warms up the richness of the mixture should decrease until at normal operating temperatures the normal or best mixture is supplied to the engine. Originally an attempt was made to accomplish this result by the use of manually operated choke valves. At the present time many automatic devices have been used to operate the choke valve, which eliminates the manual control. The present automatic choke control devices are thermostatically controlled. The thermostatic element is placed in a casing or housing in the proximity of the carburetor. Therefore a means for transmitting a heated fluid to the thermostatic element must be provided so that the temperature reaching the element is very nearly the same for corresponding engine temperatures regardless of the temperature of the surrounding air. In order to retain the heat in the casing where the thermostat is located an insulating medium is necessary. Cork has been widely used as an insulating medium for the thermostatic unit. As the cork ages it cracks, warps and breaks, thus destroying the insulating value and also the pieces of cork clog the fluid passageways and interfere with the operation of the thermostatic member.

In my improved choke control the fluid used to operate the thermostatic unit is air. Air, heated by the exhaust gas, is drawn into the chamber housing the thermostatic unit and is passed through the thermostatic spring. The heated air then leaves the above mentioned chamber and passes around said chamber. Thus any heat lost from the air does not occur until the heated air leaves the chamber in which the thermostatic element is located. The air then passes into the intake manifold. Since only a limited amount of air can be circulated and exhausted into the intake manifold it is very essential that as little heat as possible be lost.

My invention further does not allow the choke valve to close completely. If the engine backfires the pressure on the choke valve is such that in many instances the valve sticks or is locked in closed position. My invention provides a stop which prevents the choke valve from entirely closing at any time.

My invention has for its principal object the provision of insulation for the thermostatic element, used to operate the choke of a carburetor, by the utilization of the fluid that transmits the heat to the thermostatic element.

My invention will be best understood from the detailed description and claims which follow, reference being had to the accompanying drawings in which a preferred embodiment of my invention is shown by way of example in which:

Fig. 1 is a front elevation partially in section of a carburetor provided with a thermostatically controlled choke mechanism embodying my invention.

Fig. 4 is a side elevation of the cup or thermostatic spring housing.

Fig. 5 is a front elevation of the cup or thermostatic spring housing.

Fig. 6 is a side elevation of the thermostatic spring housing cover.

Fig. 7 is a front elevation of the thermostatic spring housing cover.

Fig. 8 is a side elevation of the thermostatic spring housing cover gasket.

Fig. 9 is a front elevation of the thermostatic spring housing cover gasket.

Fig. 10 is a side elevation view of the insulating bushing.

Fig. 11 is a front elevation of the insulating bushing.

Figure 2:
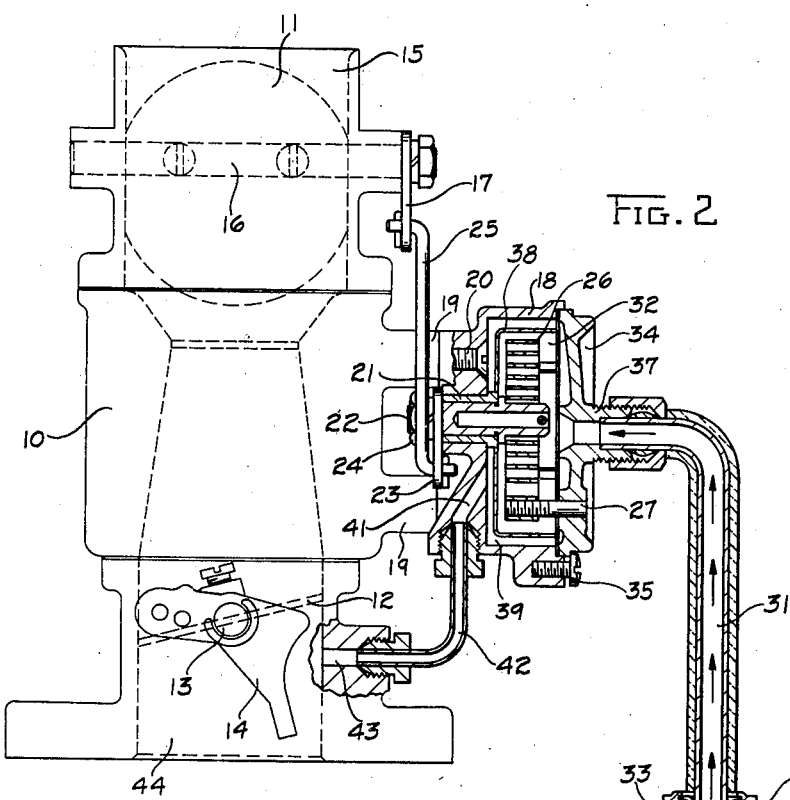
Fig. 2 is a side elevation partially in section of a carburetor provided with a thermostatically controlled choke mechanism embodying my invention.

Referring to the drawings in more detail, in Fig. 1 I have a carburetor 10 having an unbalanced choke valve 11 and a throttle 12. Carburetor 10 is shown as a plain tube downdraft carburetor, this type being shown by way of example only as the invention may be applied to any preferred type of carburetor. The throttle valve 12 is mounted on a shaft 13 which is connected to an operating lever 14. The unbalanced choke valve 11 in the air intake 15 is mounted on the shaft 16 which is connected to an operating lever 17.

A thermostat casing or housing 18 is fastened to lugs 19 by means of the screws 20 and is provided with an opening in which an insulating bushing 21 is located. A shaft 22 is journaled in the insulating bushing 21 and is provided with a lever 23 which is fastened by means of the nut 24. The lever 23 is operatively connected to the lever 17 by means of the rod 25. A thermo-responsive element 26 is fixed to the shaft 22 and wound therearound and is disposed so as to be heated by a fluid which in turn obtains its heat from the exhaust. One end of the thermo-responsive element 26 is fixed in position by means of the pin 27. The free end of the element 26 is fastened to the shaft 22 so that when the thermostat 26 is cold it is tensioned to rotate the lever 23 and close the choke valve 11 and to maintain it substantially closed during starting or as long as the thermostat is cold.

A stove or heating unit is partially inserted in the exhaust manifold 28 as shown in Fig. 2. The heating unit comprises an outer housing 29 which screws into the exhaust manifold 28 as shown in Fig. 2. The housing 29 is provided with fins or ribs 30 for absorbing more heat from the exhaust gas. An insulated tube member 31 extends into the housing 29 and communicates with the inner chamber 32 in which the thermostat 26 is located. The housing 29 is further provided with openings 33 for permitting atmospheric air to enter the housing member 29 where it is heated.

The thermostat casing 18 is provided with a cover 34 which is fastened by means of the screws 35. A gasket 36 is interposed between the cover 34 and the thermostat casing 18 in order to insure a good seal. The cap 34 is provided with a threaded hollow boss 37 adapted to be connected to the insulated tube 31.

The thermostat 26 is located within a cup member 38 which is located in the thermostat casing 18 and is spaced therefrom. The cup member 38 provides an inner or thermostat chamber 32 in which the thermostat 26 is located and an outer or insulating chamber 39. Notches 45 in the cup member 38 provide communication between the inner chamber 32 and the outer chamber 39. The thermostat casing 18 has lugs 40 to keep the cup 38 properly spaced from the inner periphery of the thermostat casing. The chamber 39 has an outlet passage 41 near its center which communicates through the tube member 42 and passageway 43 which leads into the mixture passageway 44 on the engine side of the throttle valve 12.

When the engine is started the choke valve is usually in a substantially closed position. Since the choke valve 11 is an unbalanced valve any time the engine backfires the valve 11 will tend to turn due to greater pressure on one side of the valve than on the other side. This often causes the choke valve to jam which in turn renders the engine inoperative. In applicant's novel device the air intake 15 of the carburetor is provided with a stop 46 which prevents the choke valve 11 from closing completely thereby preventing choke valve from locking in a closed position.

When the engine is started it is usually comparatively cold and the thermostatic element 26 is also cold. Under these conditions the cold thermostatic element holds the choke valve 11 in a partial or substantially closed position. During the time the engine is being cranked or when the engine is running there is a suction or sub-atmospheric pressure in the mixture passageway 44. This suction causes air to enter the openings 33 and flow to the lower part of the stove or heater 29 and then passes through the insulated tube 31 entering the chamber 32. As the air enters the chamber 32 it flows through the central portion of the thermostatic spring 26.

Figure 3:
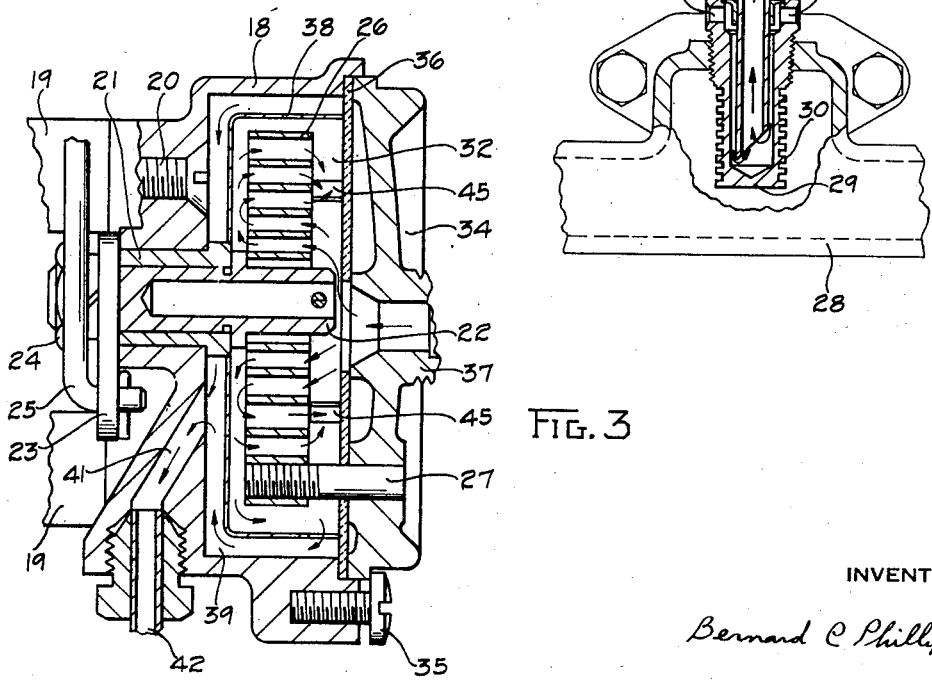
Fig. 3 is an enlarged sectional view of the thermostatic unit.

After the air has passed through the central portion of the thermostatic spring 26 it is deflected radially outwardly by the bottom of the cup member 38 and then passes through the outer portion of the thermostatic spring 26. The air is then drawn out of the chamber 32 through the passageway 45 into the outer chamber where it flows around the outer surface of the cup member 38 into the substantially centrally located exit passage 41. The air is then drawn through the tube 42 into the passageway 43 and then enters the mixture passageway 44. Arrows are shown in Figs. 2 and 3 to more clearly define the flow of air from the intake ports 33 to the exit port 43.

The purpose of the above described air passageway is to transmit heat from the exhaust gas in the manifold 28 to the thermostatic spring 26 which in turn operates the choke valve 11 in accordance with engine requirements.

When the engine is started at temperatures cold enough to require choking, the air surrounding the thermostatic spring 26 is substantially the same temperature as is the air temperature surrounding the carburetor, thus the spring will hold the choke valve 11 in a substantially closed position. As the engine warms up the air passing through the stove 29 absorbs heat and as this warmer air passes over the thermostat 26 the tension causes the shaft 22 to turn which through the lever 23, rod 25 and lever 17 causes the choke valve to open. By the time that a normal operating temperature of the engine is reached the thermostat 26 will open the choke valve 11 to a wide open position. A stop is provided so that any additional heat transmitted to the thermostat will not move the choke valve beyond the wide open position. During assembly the thermostatic spring 26 is set in a predetermined position so that the choke valve 11 will begin to open at the proper time.

Since only a small quantity of air can be bled into the intake passageway 44 without disturbing the proper fuel to air ratio for proper combustion the amount of heat that can be transmitted from the stove to the thermostatic spring chamber 32 is limited. Therefore the thermostatic spring chamber must be well insulated to prevent the radiation and conduction of heat. Attempts have been made to insulate the thermostatic spring chamber with cork and various other insulating materials. None of these materials have proven satisfactory because as these materials age they warp, crack and crumble. This destroys the insulation value and frequently the broken pieces obstruct the movement of the various moving parts or clog the passageway from the thermostatic spring chamber to the intake passage 44. As soon as this passage way is clogged, heated air can no longer be drawn through the thermostatic spring 26 causing the entire choke control unit to be inoperative. This causes excessive fuel consumption and may even render the engine inoperative at higher speeds and high temperatures. This is due to the fact that heated air no longer passes through the thermostatic spring consequently the spring temperature does not get high enough to open the choke valve 11 far enough and in many cases will not open it at all.

My novel device provides an outer chamber 39 for insulating the thermostatic spring chamber 32. Heated air from the stove 29 enters the chamber 32 from the insulated tube 31 and passes through the central portion of the thermostatic spring 26 thus transmitting heat to the spring 26. The heated air then is deflected by the bottom of the cup member 38 so that it passes through the outer portion of the spring 26 in the opposite direction, this heating the outer portion of the thermostatic spring 26. The heated air then passes through the thermostatic spring chamber through the ports 45 and flows between the cup member 38 and the thermostat casing 18 to the passageway 41. The space between the cup member 38 and the thermostat casing 18 is the outer chamber 39 which provides an insulation medium for the inner chamber. Thus it will be seen in my novel method of insulating the thermostatic spring chamber the air that heats the thermostatic spring serves a dual purpose. First it transmits heat from the stove 29 to the thermostatic spring 26 and then it serves as a means for insulating the thermostatic spring chamber 32. This method of insulating the thermostatic spring chamber does not deteriorate with age nor does it render the unit inoperable because of clogged passages. The outer or insulating chamber 39 provides a very effective insulation for the inner or thermostatic spring chamber 32. There will be substantially no heat loss from the inner chamber because the air leaving the inner chamber is circulated around the cup member 38 thus maintaining a temperature outside of the cup 38 substantially the same as the temperature inside the cup 38. Any heat loss from the air takes place in the outer chamber 39. The air serves a dual purpose—namely, to transmit heat to the thermostat 26 and to insulate the inner chamber 32.

The thermostat anchor pin 27 is threaded to reduce the surface contact between the spring 26 and the pin. This reduces the heat conduction through the pin 27. An insulating bushing 21 is placed between the thermostatically operated shaft 22 and the thermostat casing 18 to diminish the heat loss from the shaft 22 to the casing. The thermostatically operated shaft 22 is hollow at the end where the thermostatic spring is inserted in a slot. This hole provides less contact between the spring 26 and the shaft 22 thus reducing heat loss through the shaft 22. The open side of the cup member 38 is insulated by means of the insulating gasket 36. The outer periphery of this gasket is clamped between the thermostat casing 18 and the cover 24.

While I have described the details of one form of my invention, I do not wish to be limited to the particular form shown and described as it will be apparent that many modifications therein can be made without parting from the scope of my invention as set forth in the appended claims.

Having thus described by invention what I claim is:

1. In a carburetor, a throttle, a choke valve mounted on a shaft, a bimetallic spring of spiral form located in an inner chamber outside of said carburetor and operatively connected to said shaft to rotate the same, an insulating chamber partially surrounding said inner chamber, a plurality of ports communicating said inner chamber with said insulating chamber, a means for heating a fluid to temperatures dependent upon the operating temperature of the internal combustion engine, a conduit for conveying heated fluid from said heating means to said inner chamber, said heated fluid passing through said spiral spring for operating the same, said heated fluid leaving said inner chamber through said ports and acting as an insulating medium for said inner chamber as said heated fluid passes around said inner chamber, a conduit for transmitting the heated gas from said insulating chamber into the intake passageway of said carburetor on the engine side of said throttle.

2. In a carburetor, a mixture passage, a throttle in said mixture passage, an intake passage communicating with said mixture passage; a choke valve in said intake passage, mounted on a shaft; a thermostatic spring operatively connected to said shaft to rotate the same, a cup member enclosing said thermostatic spring, an outer casing surrounding said cup member and spaced therefrom, said cup member and said outer casing providing an outer chamber and an inner chamber, said cup being provided with a plurality of openings communicating said inner chamber with said outer chamber, a means for heating a fluid to temperatures dependent on the operating temperature of the internal combustion engine, a conduit for conveying heated fluid from said heating means to said inner chamber, a second conduit leading from said outer chamber to a point in said intake passage on the engine side of said throttle, the suction in said intake passage adapted to draw heated fluid from said fluid heating means, through first said conduit into said inner chamber for heating said thermostatic spring and thereby operating said choke valve in accordance with the temperature of the engine; said heated fluid flowing from said inner chamber through said plurality of openings into said outer chamber flowing around said cup member thereby insulating said inner chamber from atmospheric conditions, said heated fluid being drawn from said outer chamber through second said conduit into said mixture passage.

3. In a carburetor for an internal combustion engine, an induction passage, an air inlet passage communicating with said induction passage, a throttle valve controlling the induction passage, a choke valve in said air inlet passage mounted on a choke shaft, a thermostatic spring mounted on a rotatable shaft and operably connected to the choke shaft to modify the position of the choke valve in accordance with the temperature of the engine, a cup member enclosing said thermostatic spring and forming an inner or spring chamber, an outer casing surrounding said cup member and spaced therefrom forming an outer or insulating chamber, a plurality of openings in said cup member providing communication between said spring chamber and said insulating chamber, a means including a conduit interconnecting said insulating chamber and the induction passage on the engine side of the throttle valve, a stove in a heated portion of the engine, a means including an insulated conduit to convey heated gas from said stove to said inner chamber.

4. In an internal combustion engine, an exhaust manifold for said engine; a carburetor; an air passage for admitting air into the interior of said carburetor; a choke valve in said passage; a choke housing including an inner chamber, a thermostatic means located in said inner chamber; said thermostatic means, controlled by the temperature of a fluid heated by said exhaust manifold, for operating said choke valve; said fluid providing an insulation medium for said inner chamber after it leaves said inner chamber.

5. In an internal combustion engine in combination with the combustion chamber, a carburetor; an air passage for admitting air to the interior of said carburetor; a choke valve in said passage; an exhaust manifold for said engine; a thermostatic device, located in a chamber, subject to the influence of change of temperature of the combustion chamber by means of air flowing from a heater located in said exhaust manifold through an insulated conduit into said chamber, said air passing through an insulating chamber after it leaves first said chamber whereby first said chamber is insulated from atmospheric conditions; operative connections between said thermostatic device and said choke valve adapted to increase and decrease the opening of the choke valve upon increase and decrease of the temperature affecting the thermostatic device.

6. In a carburetor for an internal combustion engine; a throttle, a choke valve mounted on a shaft; a thermostatic spring located in a chamber and operatively connected to said shaft to increase or decrease the choke valve opening upon increase or decrease of the engine temperature, a casing fixed to the outer wall of the carburetor and enclosing said inner chamber thereby providing an insulating chamber; a conduit for conveying heated gases from a heated portion of the engine to first said chamber where the heated gas flows through said thermostatic spring and imparts heat thereto; a plurality of openings for conveying said heated gas from first said chamber to said insulating chamber; a conduit leading from said insulating chamber to a point on the engine side of said throttle; the flow of the heated gas in said insulating chamber substantially surrounding first said chamber whereby insulation for said thermostatic spring is provided.

7. In a control mechanism for an internal combustion engine carburetor having a choke valve and a throttle; a thermostat for controlling the degree of opening of the choke valve as a function of the temperature; a means for transmitting a fluid of a temperature dependent on exhaust manifold temperature through said thermostat whereby said thermostat is operated; and a means for utilizing the heat remaining in said fluid, after it passes through said thermostat, for insulating said thermostat.

8. A carburetor having a cold air entrance, a choke valve therein, a mixing chamber and a mixture outlet, a throttle valve therein, a thermostatic means located in an inner chamber for controlling said choke valve, said inner chamber communicating with an outer chamber substantially surrounding said inner chamber, a passage connecting said outer chamber to said mixture passage on the engine side of the throttle valve, another passage connecting said inner chamber to said source of heated air.

9. In combination with an internal combustion engine, a carburetor having a choke valve, temperature responsive means for operating said choke valve, a means comprising a flow of air from a heated source of supply for operating said temperature responsive means and said flow of air also providing a means for insulating said temperature responsive means.

10. In a carburetor for an internal combustion engine, a throttle, an air inlet passage, a choke valve in said air inlet passage mounted on a choke shaft journaled in the walls of said inlet passage, a casing fixed to the outer walls of said inlet passage, said casing being divided into an inner chamber and an outer chamber, a temperature responsive means in said inner chamber and operably connected to said choke shaft to modify the position of the choke valve in accordance with the temperature of the engine, a means including a conduit for conveying heated air from a heated source of supply to said inner chamber for operating said temperature responsive means, a plurality of passageways for conveying said heated air from said inner chamber to said outer chamber for providing an insulation means for said inner chamber, a means including a conduit interconnecting said outer chamber to the mixture passage of said carburetor on the engine side of said throttle valve.

BERNARD C. PHILLIPS.